US012759416B2

(12) United States Patent
Laws et al.

(10) Patent No.: US 12,759,416 B2
(45) Date of Patent: Oct. 13, 2026

(54) BATTERY ELECTRIC EXCAVATOR

(71) Applicant: Deere & Company, Moline, IL (US)

(72) Inventors: Nathan H. Laws, Sherrill, IA (US); Richard Pugh, Dubuque, IA (US); Manish M. Kute, Dubuque, IA (US); Reece J. Bachman, Dubuque, IA (US); Adam B. Zell, Dubuque, IA (US); Mark C. Eckstein, Dubuque, IA (US)

(73) Assignee: Deere & Company, Moline, IL (US)

( * ) Notice: Subject to any disclaimer, the term of this patent is extended or adjusted under 35 U.S.C. 154(b) by 361 days.

(21) Appl. No.: 18/526,037

(22) Filed: Dec. 1, 2023

(65) Prior Publication Data

US 2024/0217350 A1 Jul. 4, 2024

Related U.S. Application Data

(60) Provisional application No. 63/436,910, filed on Jan. 4, 2023.

(51) Int. Cl.

*B60L 50/64* (2019.01)
*B60H 1/00* (2006.01)
*B60L 1/00* (2006.01)
*B60L 15/00* (2006.01)
*B60L 50/60* (2019.01)
*B60R 16/08* (2006.01)

(52) U.S. Cl.

CPC .......... *B60L 50/64* (2019.02); *B60H 1/00028* (2013.01); *B60H 1/00278* (2013.01); *B60L 1/003* (2013.01); *B60L 15/007* (2013.01); *B60L 50/66* (2019.02); *B60R 16/08* (2013.01); *B60H 2001/00114* (2013.01); *B60L 2200/44* (2013.01)

(58) Field of Classification Search

CPC .......... B60L 50/64; B60L 50/66; B60L 1/003; B60L 15/007; B60L 2200/44; B60H 1/00028; B60H 1/00278; B60H 2001/00114; B60R 16/08; B60Y 2200/25

See application file for complete search history.

(56) References Cited

U.S. PATENT DOCUMENTS 7,712,555 B2 * 5/2010 Krieger
9,725,008 B2 * 8/2017 Wu
9,828,049 B2 * 11/2017 Lyle
9,896,822 B2 * 2/2018 Kohno
(Continued)

*Primary Examiner* — James A Shriver, II
*Assistant Examiner* — Nicholas R. Kandas
(74) *Attorney, Agent, or Firm* — Lucian Wayne Beavers; Patterson Intellectual Property Law, PC

(57) ABSTRACT

A battery powered electric excavator includes an undercarriage including left and right crawler tracks. A main frame is mounted on the undercarriage to be pivotable about a vertical pivot axis relative to the undercarriage. An operator's cabin is located on the main frame closer to the forward end than to the rearward end and located to one lateral side of the vertical pivot axis. At least one high voltage battery is located on the main frame rearward of the vertical pivot axis and rearward of the operator's cabin. A primary electric motor is operably connected to the at least one high voltage battery. At least one main hydraulic pump is driven by the primary electric motor. The primary electric motor, the main hydraulic pump, and a hydraulic reservoir are located on the main frame on an opposite lateral side of the vertical pivot axis from the operator's cabin.

15 Claims, 17 Drawing Sheets

(56) References Cited

U.S. PATENT DOCUMENTS

| | | | |
|---|---|---|---|
| 11,345,331 | B2 * | 5/2022 | McKibben |
| 2023/0182574 | A1 * | 6/2023 | De Caen |
| 2025/0354349 | A1 * | 11/2025 | Kuwahara |

* cited by examiner

FIG. 14C
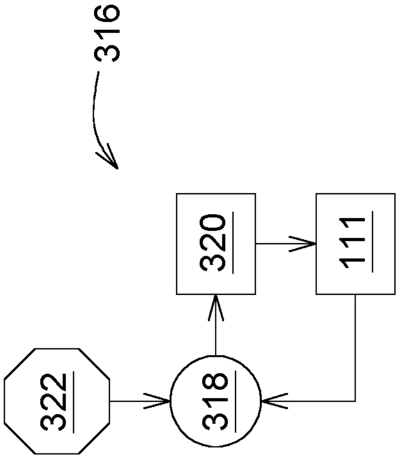
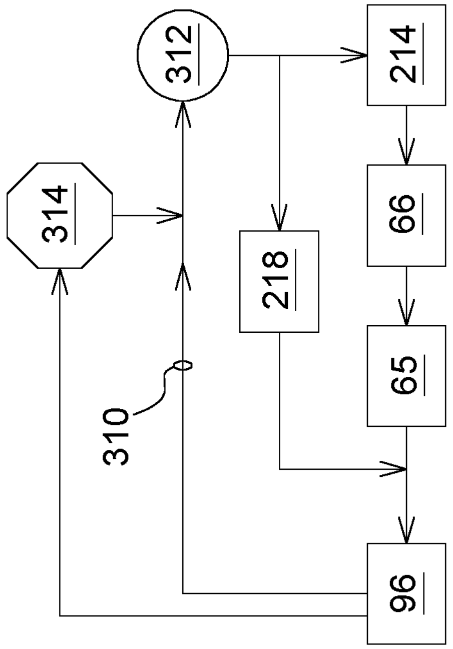
FIG. 14B
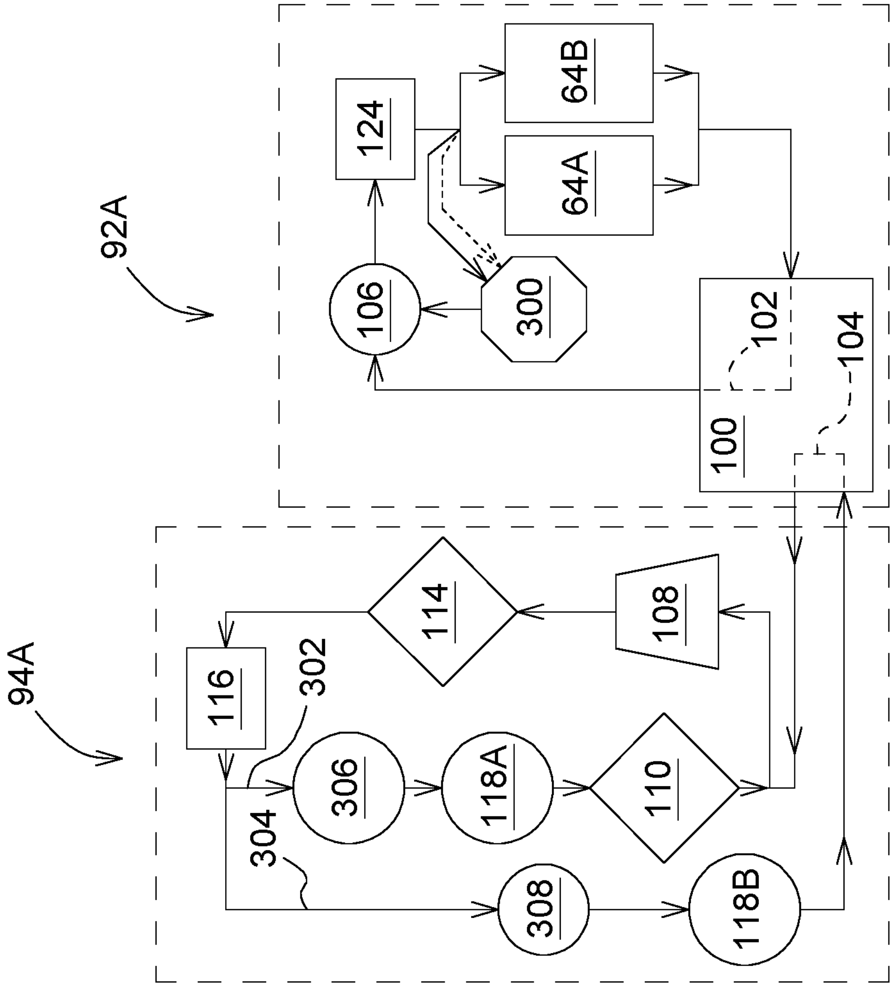
FIG. 14A

BATTERY ELECTRIC EXCAVATOR

BACKGROUND OF THE DISCLOSURE

Field of the Disclosure

The present disclosure relates to a battery electric excavator and particularly to the arrangement of electrical and hydraulic power components on a reduced tail swing battery powered electric excavator.

Description of the Prior Art

One issue which must be addressed in a battery powered electric excavator is the placement of the major components such as the batteries, primary electric motor and hydraulic pump drive, and the cooling system. This is particularly true for a reduced tail swing electric excavator wherein the floor space available on the frame of the machine is limited. As compared to a conventional internal combustion engine powered excavator, the electrical batteries, the primary electric motor and main hydraulic pump collectively occupy a much larger volume than the fuel tank and the internal combustion engine which they replace.

Accordingly, there is a need for improvements in the arrangements of such components on a battery powered electric excavator.

SUMMARY OF THE DISCLOSURE

In one embodiment a battery powered electric excavator includes an undercarriage including left and right crawler tracks. A main frame is mounted on the undercarriage to be pivotable about a vertical pivot axis relative to the undercarriage. The main frame has a forward end and a rearward end and has a longitudinal axis extending between the forward end and the rearward end. An excavator arm extends from the forward end of the main frame. An operator's cabin is located on the main frame closer to the forward end than to the rearward end and located to one lateral side of the vertical pivot axis. At least one high voltage battery is located on the main frame rearward of the vertical pivot axis and rearward of the operator's cabin. A primary electric motor is operably connected to the at least one high voltage battery. At least one main hydraulic pump is driven by the primary electric motor. A hydraulic reservoir is mounted on the main frame for supplying hydraulic fluid to the main hydraulic pump. The primary electric motor, the main hydraulic pump, and the hydraulic reservoir are located on the main frame on an opposite lateral side of the vertical pivot axis from the operator's cabin.

In another embodiment a battery powered electric excavator includes an undercarriage including left and right crawler tracks. A main frame is mounted on the undercarriage to be pivotable about a vertical pivot axis relative to the undercarriage. The main frame has a forward end and a rearward end. An excavator arm extends from the forward end of the main frame. An operator's cabin is located on the main frame. At least one high voltage battery is located on the main frame. A primary electric motor is operably connected to the at least one high voltage battery. At least one main hydraulic pump is driven by the primary electric motor. A hydraulic reservoir is mounted on the main frame for supplying hydraulic fluid to the main hydraulic pump. The hydraulic reservoir is located directly above the main hydraulic pump.

In another embodiment a battery powered electric excavator includes an undercarriage including left and right crawler tracks. A main frame is mounted on the undercarriage to be pivotable about a vertical pivot axis relative to the undercarriage. The main frame has a forward end and a rearward end and has a longitudinal axis extending between the forward end and the rearward end. An excavator arm extends from the forward end of the main frame. An operator's cabin is located on the main frame. At least one high voltage battery is located on the main frame. A primary electric motor is operably connected to the at least one high voltage battery. At least one main hydraulic pump is driven by the primary electric motor. A hydraulic reservoir is mounted on the main frame for supplying hydraulic fluid to the main hydraulic pump. At least one heat exchanger and fan assembly including at least one fan for moving cooling air across at least one heat exchanger is oriented to move the cooling air in a direction within plus or minus 60 degrees of the longitudinal axis of the main frame.

Numerous objects, features and advantages of the present invention will be readily apparent to those skilled in the art upon a review of following description in conjunction with the accompanying drawings.

BRIEF DESCRIPTION OF THE DRAWINGS

FIG. 14A is a schematic diagram of an alternative cooling system for the high voltage batteries.

FIG. 14B is a schematic diagram of an alternative cooling system for the power electronics.

FIG. 14C is a schematic diagram of an alternative cabin heating system.

DETAILED DESCRIPTION

Figure 1:
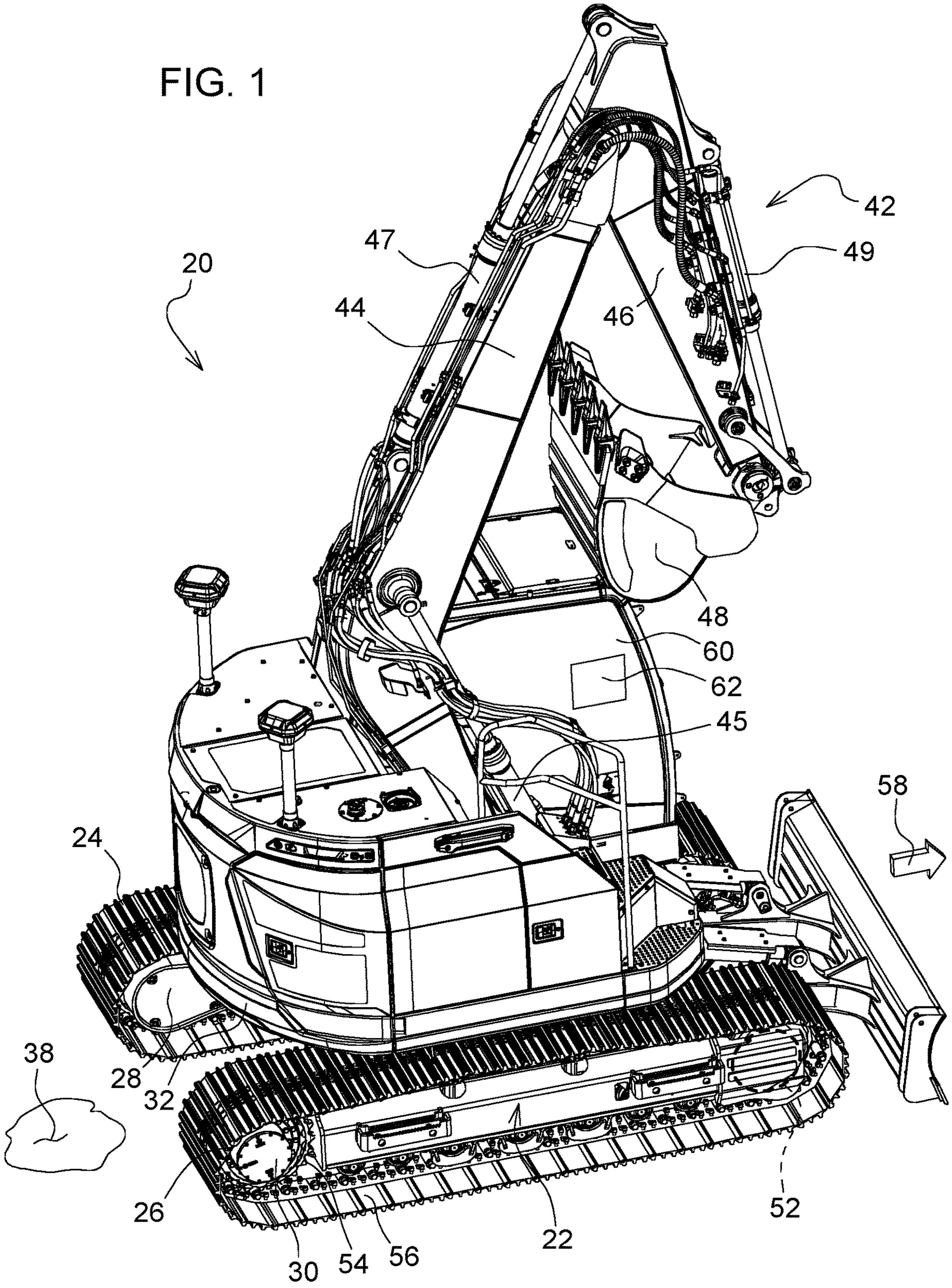
FIG. 1 is a right rear upper perspective view of the battery powered electric excavator of the present disclosure.

Referring now to the drawings and particularly to FIG. 1, a battery powered electric excavator is shown and generally designated by the number 20.

The electric excavator 20 includes an undercarriage 22 including first and second ground engaging units or crawler tracks 24 and 26 including first and second hydraulic travel motors 28 and 30 for driving the first and second ground engaging units 24 and 26, respectively.

Figure 12:
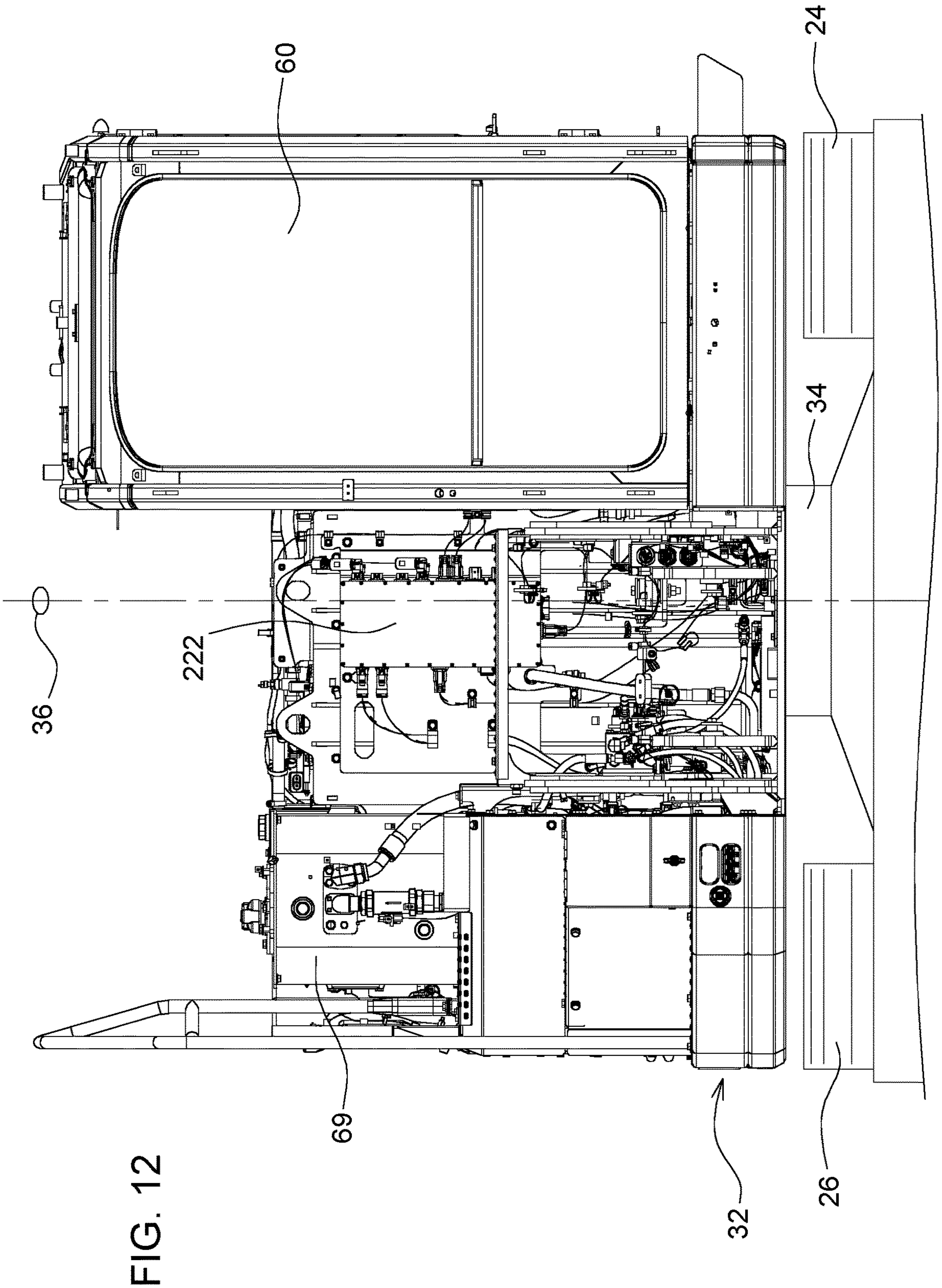
FIG. 12 is a front elevation view of the battery powered electric excavator of FIG. 1, with some housing panels removed to show the location of a junction box for the high voltage components.

As seen in FIG. 12 main frame 32 is supported from the undercarriage 22 by a swing bearing 34 such that the main frame 32 is pivotable about a pivot axis 36 relative to the undercarriage. The pivot axis 36 is substantially vertical when a ground surface 38 engaged by the ground engaging units 24 and 26 is substantially horizontal. A hydraulic swing motor 40 (see FIG. 13) is configured to pivot the main frame 32 on the swing bearing 34 about the pivot axis 36 relative to the undercarriage 22.

The swing bearing 34 includes an upper ring configured to be bolted to the underside of the main frame 32, and a lower ring configured to be bolted to the undercarriage 22. The lower ring includes an internally toothed ring gear. The swing motor 40 is mounted on the main frame 32 and drives a pinion gear 41 (see FIG. 13) which extends downward into engagement with the internally toothed ring gear. Operation of the swing motor 40 drives the pinion gear 41 which results in pivoting movement of the main frame 32 on the swing bearing 34 about the pivot axis 36 relative to the undercarriage 22.

The electric excavator 20 is shown as one of a class of excavators sometimes referred to as reduced tail swing excavators. The main frame 32 may be described as having a front or forward end 32F and a rear or rearward end 32R and having a longitudinal axis 33 extending between the front end 32F and rear end 32R. In a reduced tail swing excavator, the main frame 32 is configured so that an overhang of its rearward end 32R, including any housing or the like mounted thereon, past the footprint of the tracks 24 or 26 during pivoting of the main frame 32 relative to the undercarriage 22 is reduced as compared to conventional excavators of the same size class. In a reduced tail swing excavator, the overhang may be as little as a few inches, or even zero. For purposes of the present disclosure a reduced tail swing excavator is considered to be an excavator wherein the rearward end 32F of the main frame 32 does not extend more than 18 inches beyond the crawler tracks 24 or 26 during pivoting of the main frame 32 on the undercarriage 22. This allows the excavator 20 to work relatively close to walls or other obstacles.

A boom assembly or excavator arm 42 extends forward from the forward end 32F of the main frame 32. Boom assembly 42 includes a boom 44, an arm 46 pivotally connected to the boom 44, and a working tool 48. Hydraulic actuators 45, 47 and 49 may control the articulated motion of the boom 44, arm 46 and working tool 48, respectively. The boom 44 is pivotally attached to the main frame 32 to pivot about a generally horizontal axis relative to the main frame 32. The working tool in this embodiment is an excavator shovel 48 which is pivotally connected to the arm 46.

In the embodiment of FIG. 1 the first and second ground engaging units 24 and 26 are left and right crawler tracks, respectively. Each of the tracked ground engaging units includes a front idler 52, a drive sprocket 54, and a track chain 56 extending around the front idler 52 and the drive sprocket 54. The travel motor 28 or 30 of each tracked ground engaging unit 24 or 26 drives its respective drive sprocket 54. Each tracked ground engaging unit has a forward traveling direction 58 defined from the drive sprocket 54 toward the front idler 52. The forward traveling direction 58 of the tracked ground engaging units also defines a forward traveling direction 58 of the undercarriage 22 and thus of the electric excavator 20.

An operator's cab 60 may be located on the main frame 32. The operator's cab 60 and the boom assembly 42 may both be mounted on the main frame so that the operator's cab 60 faces in a working direction of the boom assembly. A control station 62 may be located in the operator's cab 60.

Also mounted on the main frame 32 are one or more high voltage batteries 64 for powering the electric excavator 20. In the embodiment shown in FIG. 8, the one or more batteries 64 include two batteries 64A and 64B.

Figure 9:
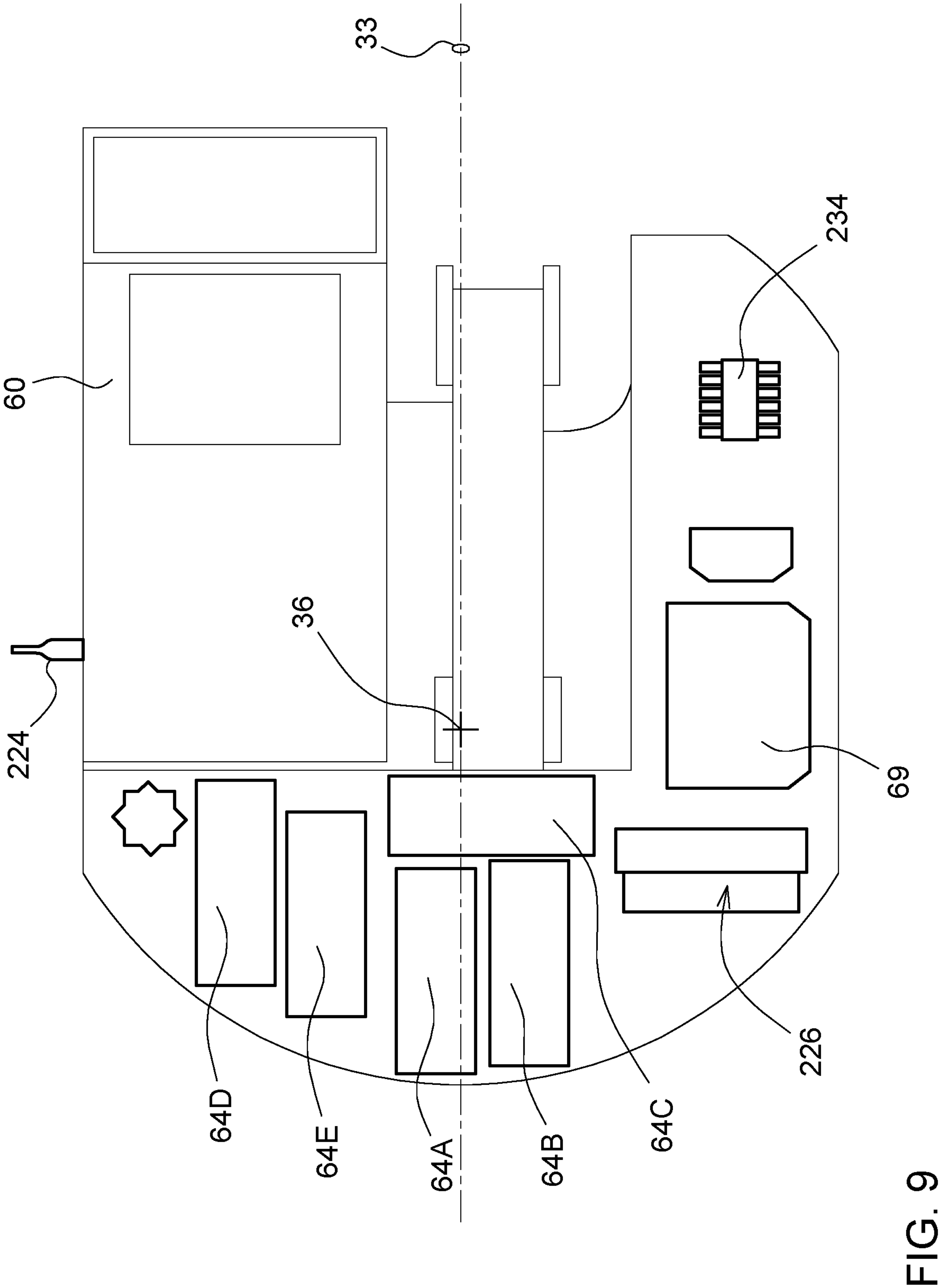
FIG. 9 is a schematic plan view of a battery powered electric excavator with an alternative component layout on the machine.

In an alternative embodiment shown in FIG. 9, the one or more batteries 64 includes five batteries 64A, 64B, 64C, 64D and 64E. Also shown in FIG. 9 is an alternative location for the heat exchanger and fan assembly 226, which is further discussed below.

Figure 9A:
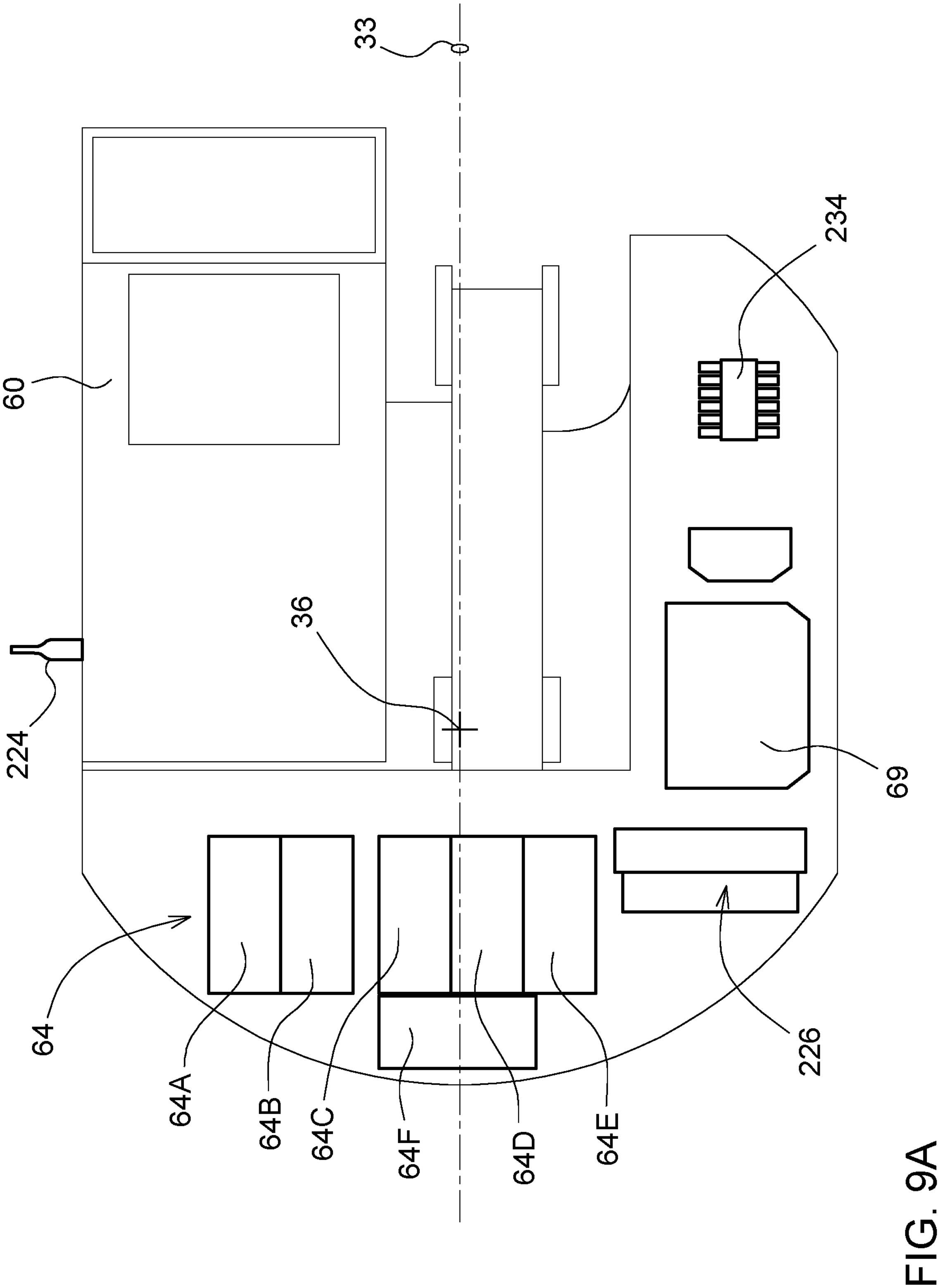
FIG. 9A is a schematic plan view of a battery powered electric excavator with another alternative component layout on the machine.

In another alternative embodiment shown in FIG. 9A, the one or more batteries 64 includes six batteries 64A, 64B, 64C, 64D, 64E and 64F. Also shown in FIG. 9A is an alternative location for the heat exchanger and fan assembly 226.

The batteries 64 may provide power through a power electronics component 65 to a primary electric motor 66 driving at least one hydraulic pump 68 to provide hydraulic power to the various operating systems of the electric excavator 20. The batteries 64, the power electronics component 65, the electric motor 66, the hydraulic pump 68 and the related hydraulic power system for the electric excavator 20 are illustrated schematically in FIG. 13 which is further described below.

Figure 13:
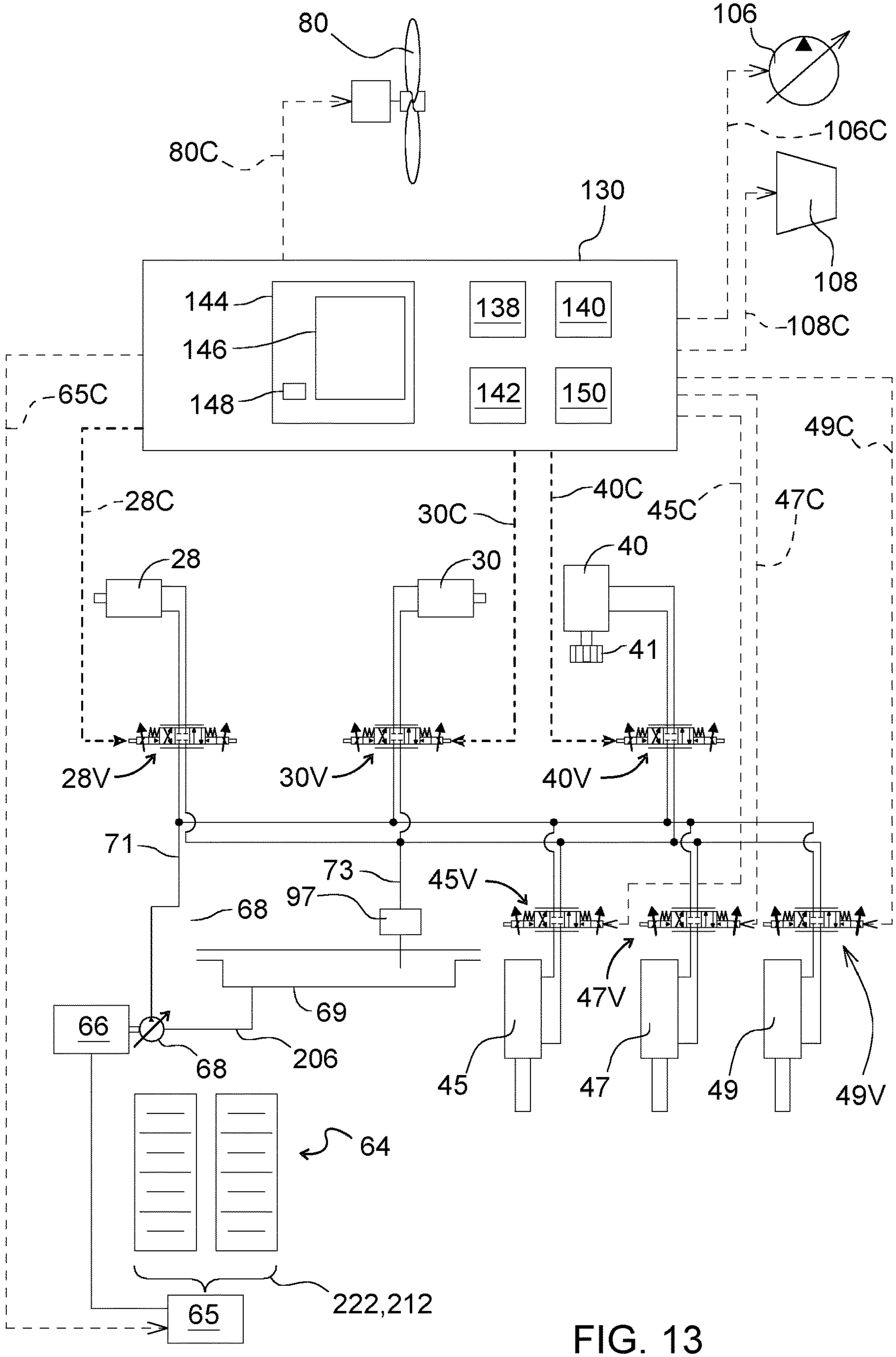
FIG. 13 is a schematic diagram of an electrohydraulic control system for the battery powered electric excavator of FIG. 1.

FIG. 13 schematically illustrates one embodiment of the electric/hydraulic power supply system of the electric excavator 20 along with a controller 130. Controller 130 includes or may be associated with a processor 138, a computer readable medium 140, a data base 142 and an input/output module or control panel 144 having a display 146. The control panel 144 may be a part of the control station 62 in the cabin 60. An input/output device 148, such as a keyboard, joystick or other user interface, is provided so that the human operator may input instructions to the controller. It is understood that the controller 130 described herein may be a single controller having all of the described functionality, or it may include multiple controllers wherein the described functionality is distributed among the multiple controllers.

Various operations, steps or algorithms as described in connection with the controller 130 can be embodied directly in hardware, in a computer program product 150 such as a software module executed by the processor 138, or in a combination of the two. The computer program product 150 can reside in RAM memory, flash memory, ROM memory, EPROM memory, EEPROM memory, registers, hard disk, a removable disk, or any other form of computer-readable medium 140 known in the art. An exemplary computer-readable medium 140 can be coupled to the processor 138 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

Control signals from controller 130 to the various electrically powered components described herein are indicated by dashed lines numbered with number of the controlled component followed by the suffix C.

In the embodiment illustrated in FIG. 13 electric power from the high voltage batteries 64 drives the primary electric motor 66 which drives the hydraulic pump 68 which provides hydraulic power to the various hydraulic motors and actuators including travel motors 28 and 30, swing motor 40, and the hydraulic cylinders 45, 47 and 49. The hydraulic pump 68 may draw hydraulic fluid from a reservoir 69 and provide pressurized hydraulic fluid to hydraulic fluid supply line 71. Electric/hydraulic control valves 28V, 30V, 40V, 45V, 47V and 49V associated with the motors and actuators 28, 30, 40, 45, 47 and 49, respectively may be controlled by the controller 130 to control the flow of hydraulic fluid to the motor or actuator as needed. Spent hydraulic fluid is returned to hydraulic fluid return line 73 which returns it to the reservoir 69.

Electric power may also be provided from high voltage batteries 64 to various electrically powered accessories of the electric excavator. An associated electrical power circuit is further shown in FIG. 15. In alternative embodiments any one or more of the hydraulic motors and hydraulic cylinders may be replaced by electrically powered actuators which are directly powered by the high voltage batteries 64.

The power electronics component 65 may condition the electrical power from the high voltage batteries 64 and control the flow of that power to the main electric motor 66 and other electrical accessories under the control of controller 130.

Figure 14:
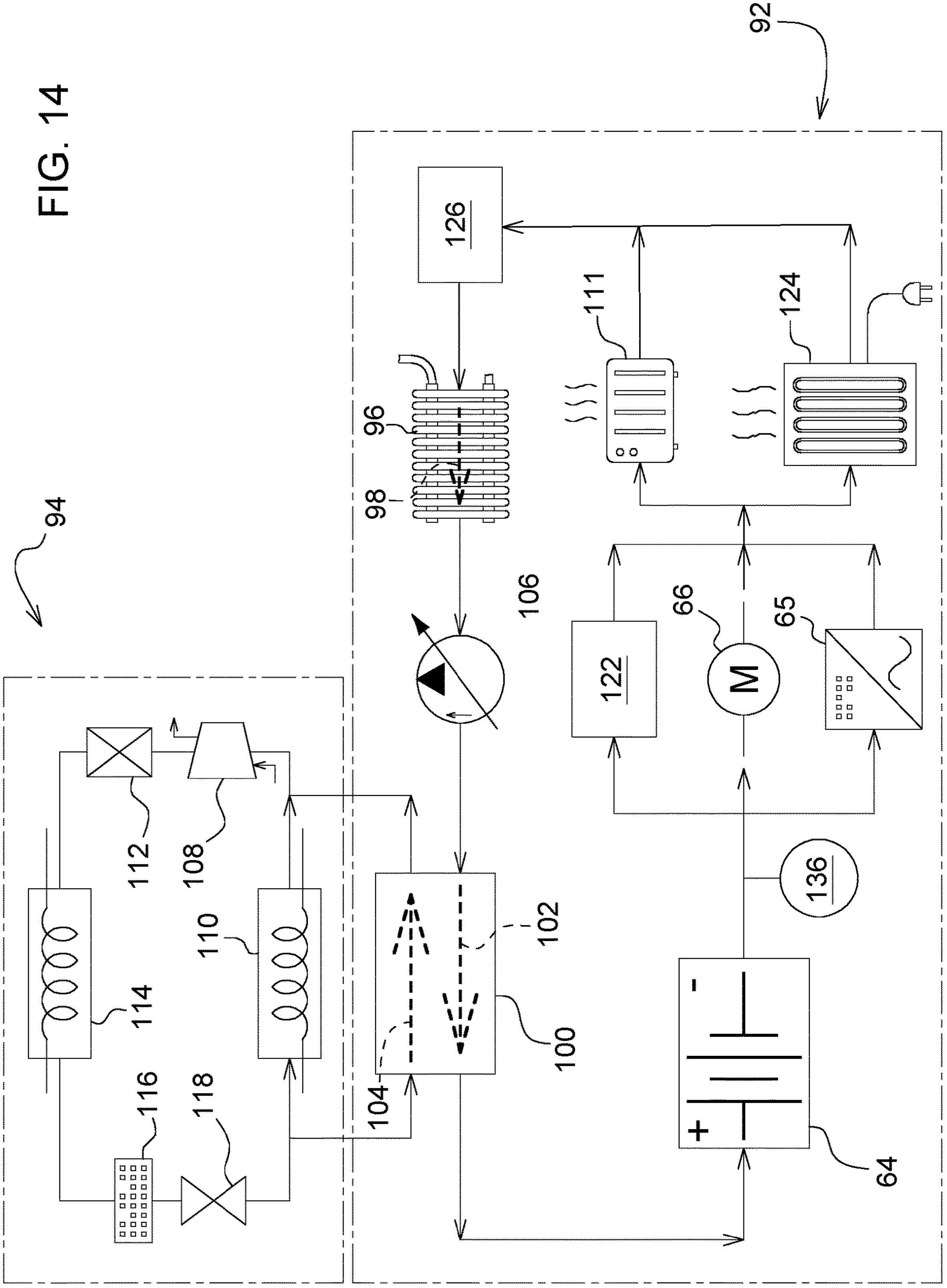
FIG. 14 is a schematic diagram of a cooling system for the battery powered electric excavator of FIG. 1.

The batteries 64, the hydraulic system, and the various electronic components generate substantial heat which must be removed for proper operation. FIG. 14 schematically illustrates one embodiment of an integrated cooling system including a battery coolant loop 92 and a refrigerant loop 94 of the electric excavator 20. The battery coolant loop 92 may circulate a battery coolant fluid past the batteries 64 for cooling the same. The refrigerant loop 94 may provide air conditioning to the operator's cabin 60.

A heat exchanger 96 is disposed in the battery coolant loop 92 to aid in cooling the battery coolant. A fan 80 pulls ambient air across the external surface of the heat exchanger 96 to cool the coolant flowing through an internal flow path 98 of the heat exchanger 96 as schematically represented in FIG. 14. A hydraulic oil cooler 97 (see FIG. 13) may also be located in front of the fan 80. The hydraulic oil cooler 97 may cool hydraulic oil flowing through return line 73 as seen in FIG. 13. The fan 80, heat exchanger 96 and hydraulic oil cooler 97 may all be part of a heat exchanger and fan assembly 226 further described below.

A chiller 100 provides a heat exchange connection between the battery coolant loop 92 and the refrigerant loop 94. The chiller 100 includes a first flow path 102 and a second flow path 104 in heat exchange relation with each other. As can be seen in FIG. 14 the battery coolant loop 92 is configured to flow the battery coolant in heat exchange relation with the batteries 64 and through the internal flow path 98 of the heat exchanger 96 and the first flow path 102 of the chiller 100. The battery coolant loop includes a coolant pump 106 for circulating the battery coolant through the battery coolant loop 92. Coolant pump 106 may be driven by an electric motor or by a hydraulic motor. Commercially available large scale lithium-ion batteries such as the high voltage batteries 64 are designed with proprietary cooling technologies which may include battery coolant flow through integrated cooling passages in the batteries, or which may include total immersion cooling of the batteries. Examples of battery coolants are dielectric liquids such as the Novec fluid available from the 3M Company and the Galden fluid available from the Solvay Company.

The refrigerant loop 94 is configured to flow a refrigerant through the second flow path 104 of the chiller 100 so that the refrigerant may further cool the coolant of the coolant loop 92. The refrigerant loop 94 includes a compressor 108 for circulating the refrigerant through the refrigerant loop 92. Compressor 108 may be driven by an electric motor or by a hydraulic motor. The refrigerant may be any suitable refrigerant fluid commonly used in air conditioning systems.

The cabin 60 of the electric excavator 20 may include a cabin air cooling system including a cabin cooling air heat exchanger 110 providing heat exchange relation between the refrigerant loop 94 and cabin air inside the cabin 60 to cool the cabin air. The cabin 60 may also include a cabin heating air heat exchanger 111 providing heat exchange relation between the coolant loop 92 and the cabin air inside the cabin 60 to heat the cabin air.

Refrigerant circulated by the compressor 108 may flow through an oil trap 112, a condenser heat exchanger 114, a drier 116, an expansion valve 118, then in parallel through the cabin air cooling heat exchanger 110 and chiller 100, then back to an intake side of the compressor 108.

Coolant circulated by the coolant pump 106 of the battery coolant loop 92 may flow through the chiller 100, then past the batteries 64. Coolant loop 92 shows the coolant from the batteries 64 then flowing in parallel past the main electric motor 66, the power electronics component 65 and miscellaneous other powered accessories 122 to cool those components. A battery coolant temperature sensor 136 may be configured to sense a battery coolant temperature.

Then the coolant may flow in parallel past the cabin heating air heat exchanger 111 and an electric battery heater 124. Heat may be transferred from the coolant to cabin air flowing over the cabin heating air heat exchanger to heat the cabin air. Heat may be transferred from the battery heater 124 to the coolant to cool the battery heater 124. The battery heater 124 may be plugged into an external power source to electrically pre-heat the batteries 64 to an operable temperature when the external ambient temperature is extremely low.

FIG. 14 then shows the coolant flowing through a remote preconditioning unit 126 then through the internal passage 98 of the heat exchanger 96 and back to the intake of coolant pump 106. The remote preconditioning unit 126 may be used to inject hot coolant into the coolant loop 92 to warm up the various components of the coolant loop 92 from a cold starting condition.

FIGS. 14A-14C illustrate an alternative embodiment of a cooling system in which the power electronics cooling loop and the cabin heating loop are separate from the battery coolant loop and the refrigerant loop.

In FIG. 14A a modified battery coolant loop is designated as 92A and a modified refrigerant loop is designated as 94A. In the battery coolant loop 92A the pump 106 circulates battery coolant fluid from the first flow path 102 of chiller 100 through the electric battery heater 124 and then through the cooling passages of the two high voltage batteries 64A and 64B, then back to the chiller 100. The electric battery heater 124 may be used to preheat the coolant in battery coolant loop 92A when it is desired to start up operation of the batteries 64 on a cold day. Make up coolant fluid as needed is provided from a coolant reservoir 300. In the refrigerant loop 94A the compressor 108 pumps refrigerant fluid through condenser 114, then through drier 116 and then through parallel channels 302 and/or 304 to the evaporator 110 and/or the second flow path 104 of chiller 100. The evaporator 110 may also be referred to as the cabin cooling air heat exchanger 110. In the first channel 302 there is a first control valve 306 and a first expansion valve 118A. In the second channel 304 there is a second control valve 308 and a second expansion valve 118B.

In FIG. 14B a separate power electronics cooling loop 310 is shown. A second pump 312 circulates a coolant liquid through the coolant passages of the DC/DC converter 214, the primary electric motor 66, the DC/AC inverter 65 and the on-board charger 218 as shown. Hot coolant flows through the radiator 96 where it is cooled by air from fans 80 as part of the heat exchanger and fan assembly 226 further described below. Make up coolant fluid is provided from a second coolant reservoir 314. Any overflow of coolant fluid from radiator 96 flows back to the second coolant reservoir 314.

In FIG. 14C a separate cabin heating loop 316 is schematically shown. A third pump 318 circulates a fluid medium, which may be water and antifreeze, through an electric heater 320 and then through the cabin heating air heat exchanger 111. Make up fluid medium is provided from a third coolant reservoir 322.

Figure 5:
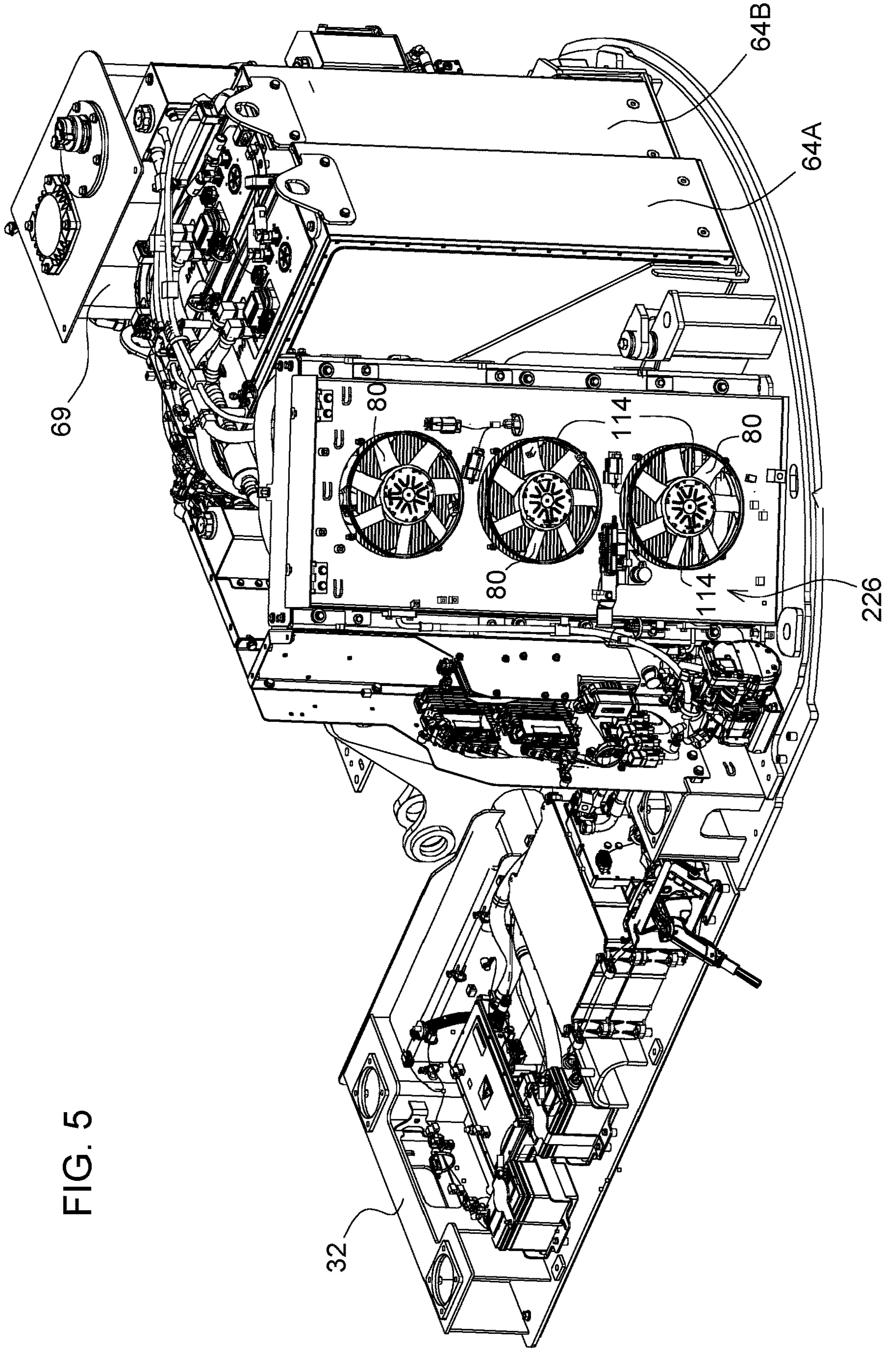
FIG. 5 is a left rear upper perspective view of the battery powered electric excavator of FIG. 1, with the excavator front working unit, the operator's station, and a number of housing panels removed to show the locations of portions of the electrical and hydraulic power systems.
Figure 6:
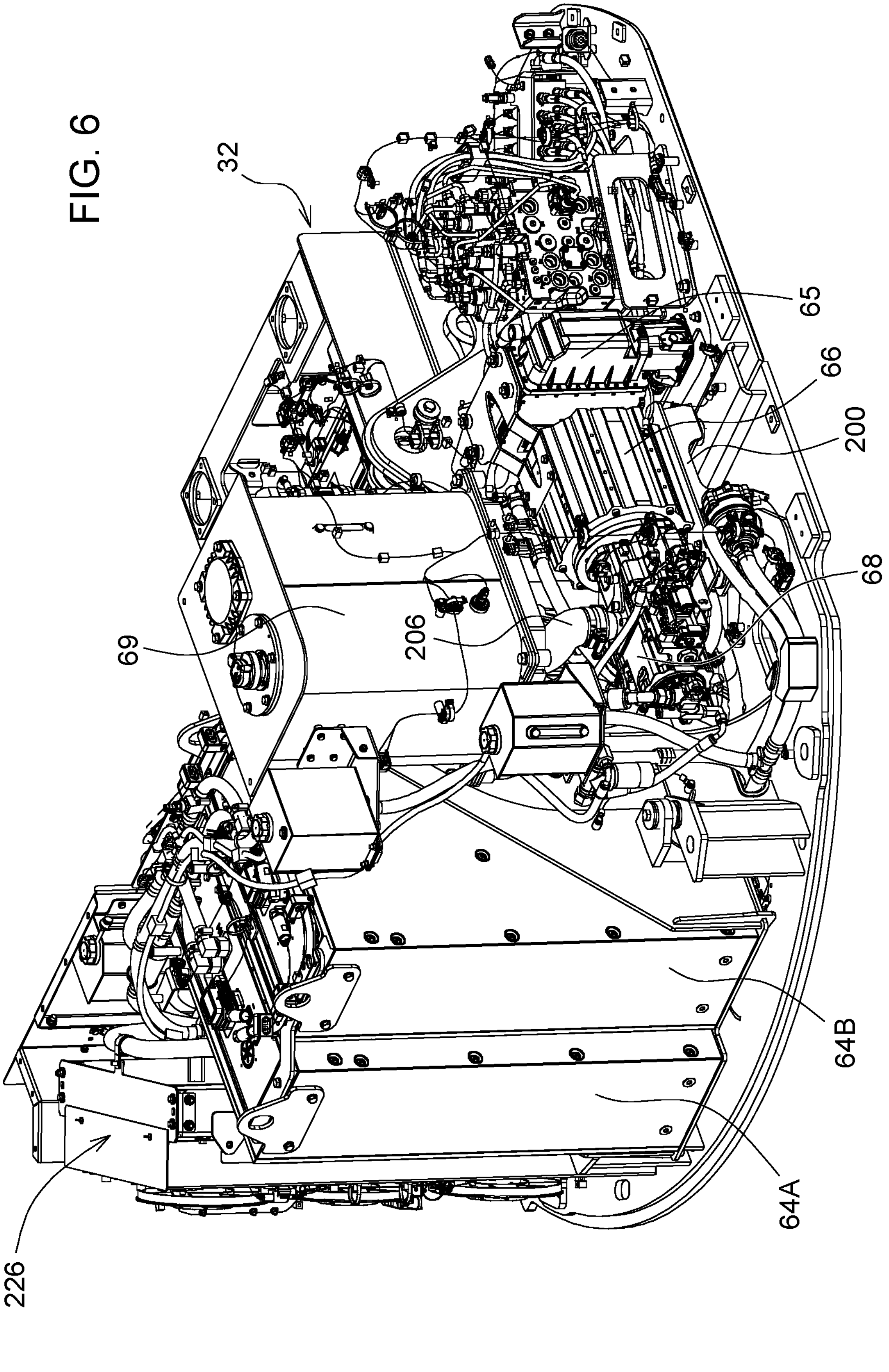
FIG. 6 is a right rear upper perspective view of the battery powered electric excavator of FIG. 1, with the excavator front working unit, the operator's station, and a number of housing panels removed to show the locations of portions of the electrical and hydraulic power systems.
Figure 7:
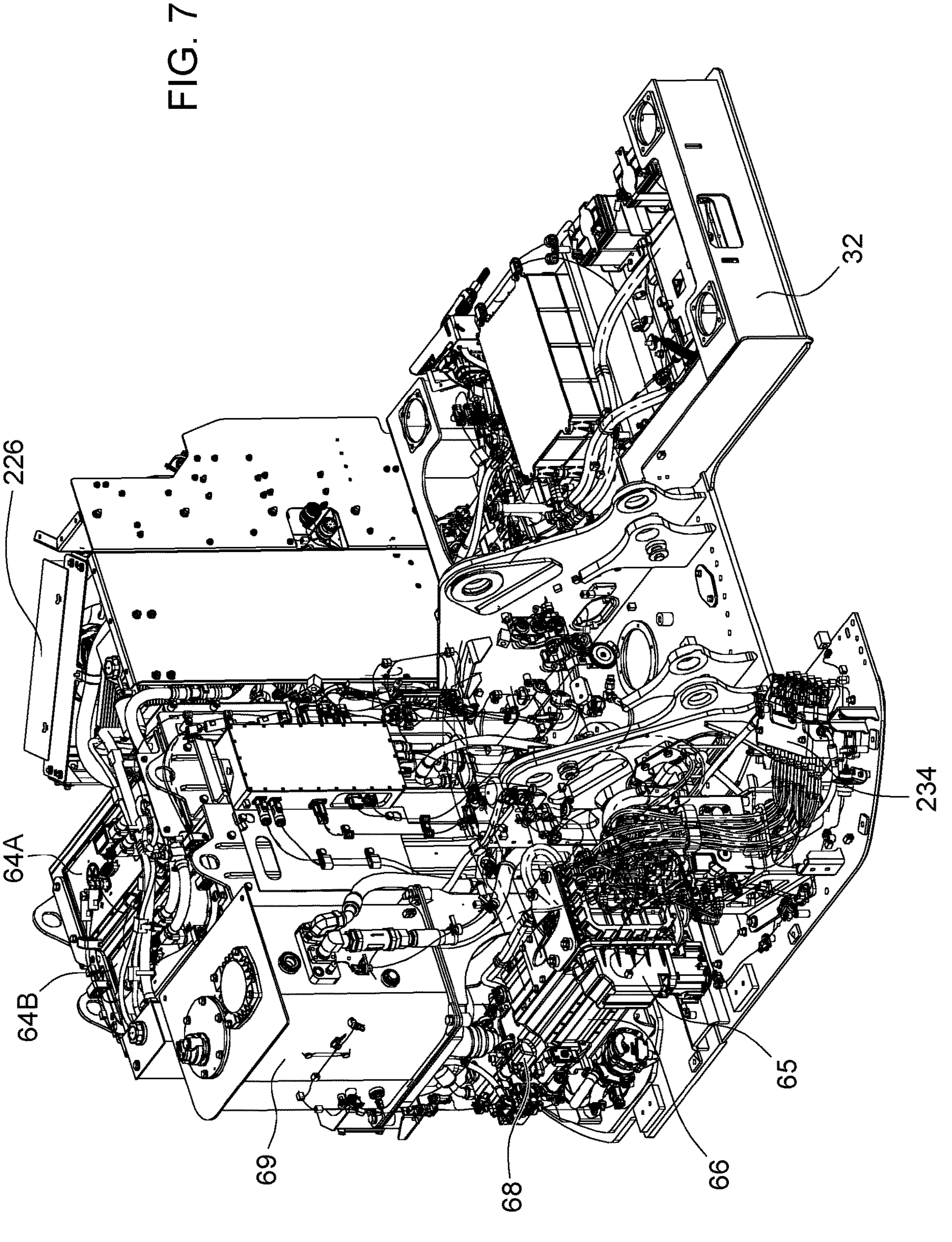
FIG. 7 is a right front upper perspective view of the battery powered electric excavator of FIG. 1, with the excavator front working unit, the operator's station, and a number of housing panels removed to show the locations of portions of the electrical and hydraulic power systems.

Any of the air cooled heat exchangers described above may be a part of the heat exchanger and fan assembly 226. For example, in one embodiment the fans 80 may pull in outside air and push that air first through the condenser 114 which may extend the full height of the assembly 226 as indicated in FIG. 5. The hydraulic oil cooler 97 and the radiator 96 may be located behind the condenser 114 so the cooling air next flows over the hydraulic oil cooler 97 and the radiator 96. Then the hot air is directed toward the interior area of the main frame 32 and exits towards the front end 32F.

Layout of the Electrical and Hydraulic Systems:

The placement of the main components in the battery powered electric excavator 20 is paramount to successful vehicle function. This is particularly true for a reduced tail swing electric excavator wherein the available footprint of the main frame 32 is limited. As compared to a conventional internal combustion engine powered excavator, the electrical batteries 64 and the primary electric motor 66 and main hydraulic pump 68 collectively occupy a much larger volume than the fuel tank and the internal combustion engine which they replace. This creates a packaging challenge and thus the importance of component placement.

Figure 3:
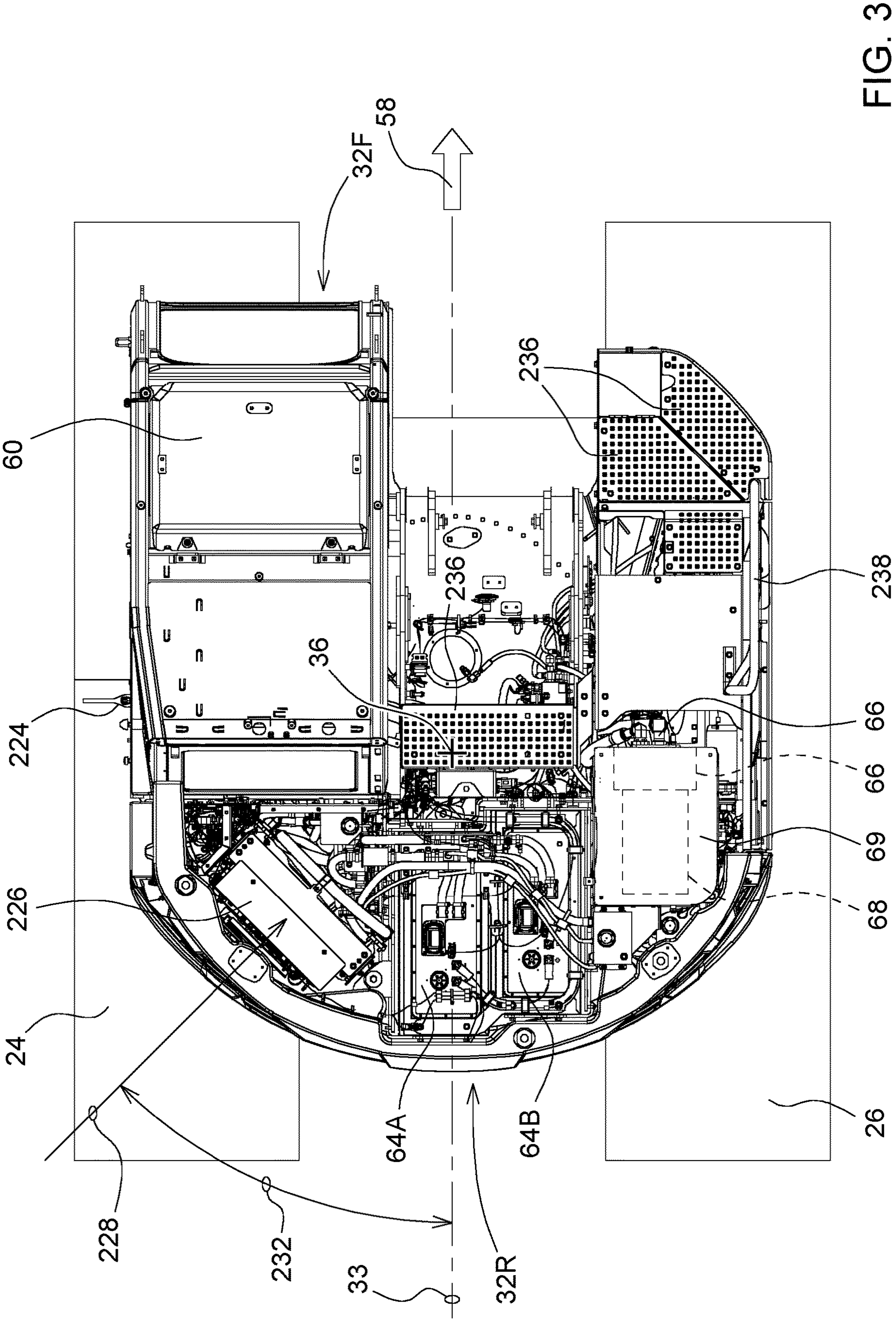
FIG. 3 is a plan view of the battery powered electric excavator of FIG. 1, with the excavator front working unit and a number of housing panels removed to show the locations of portions of the electrical and hydraulic power systems.
Figure 4:
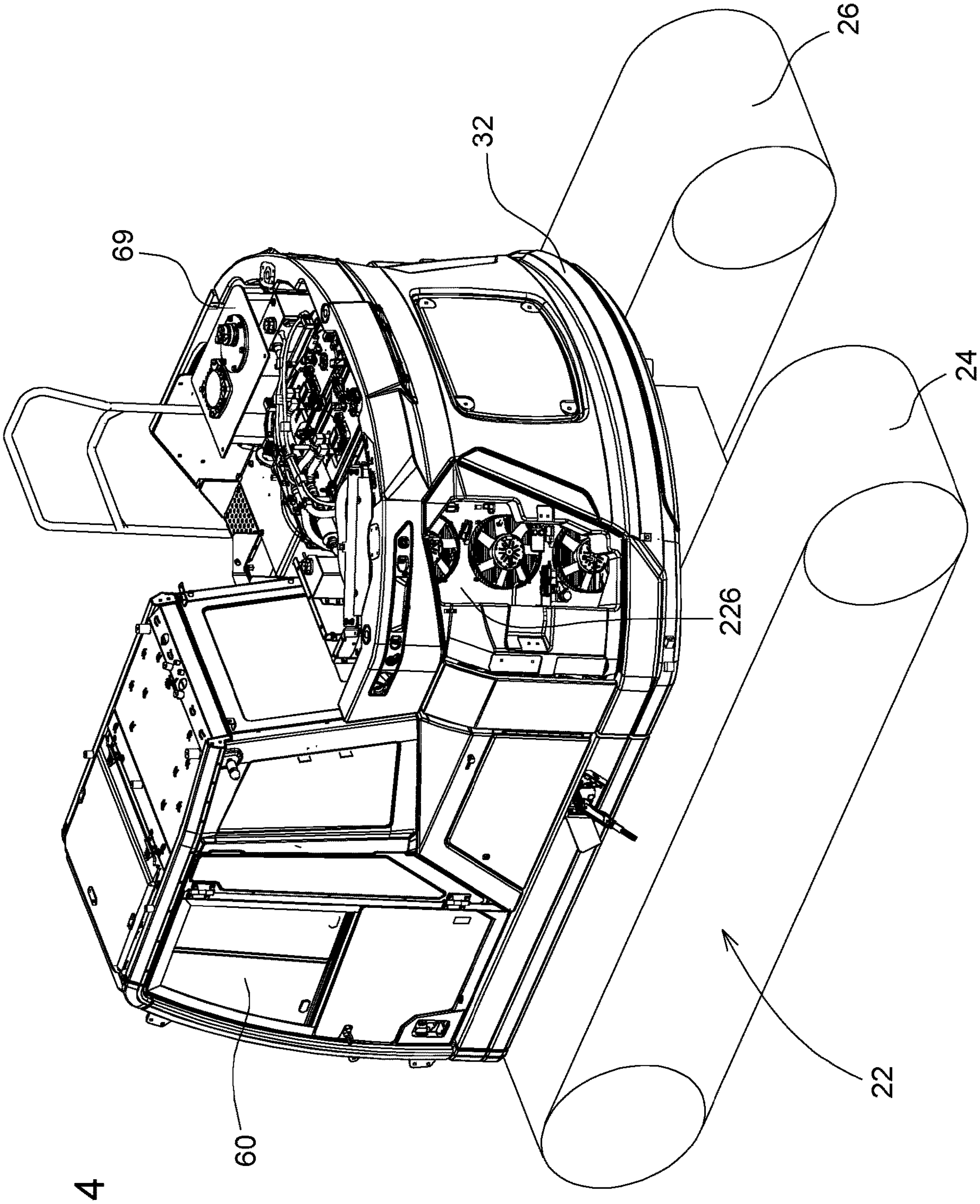
FIG. 4 is a left rear upper perspective view of the battery powered electric excavator of FIG. 1, with the excavator front working unit and a number of housing panels removed to show the locations of portions of the electrical and hydraulic power systems.

As best seen in the plan view of FIG. 3, the operator's cabin 60 is located on the main frame 32 closer to the forward end 32F than to the rearward end 32R, and located to the left lateral side of the vertical pivot axis 36 and of the longitudinal axis 33. The high voltage batteries 64A and 64B are located on the main frame 32 rearward of the vertical pivot axis 36 and rearward of the operator's cabin 60. The primary electric motor 66, the main hydraulic pump 68, and the hydraulic reservoir 69 are all located on the main frame 32 on the opposite side, i.e. the right side, of the vertical pivot axis 36 and the longitudinal axis 33 from the operator's cabin 60.

The high voltage batteries 64A and 64B are placed in the rear of the machine 20, as close to the limit of the swing radius, i.e. as far from the vertical pivot axis 36, as possible. This placement not only allows for more space in the center of the machine, but most importantly, uses the high mass of the batteries 64A and 64B as counterweight to the working loads of the excavator arm 42. Using the batteries 64A and 64B as counterweight is most effective when the batteries are the most rearward. This saves space on the electric excavator 20 by reducing the amount of any other steel counterweights which might be needed and saves overall costs. Additionally, due to the central location of the batteries 64 in the machine 20, routing of electrical and cooling conduits is improved. High voltage cables are large and difficult to route. The battery location shown solves routing issues that would be caused if the batteries were located elsewhere.

The primary electric motor 66 is the prime mover of the electric excavator 20 replacing the internal combustion engine of a traditional excavator. Placement of the primary electric motor 66 and the main hydraulic pump 68 on the right-hand side of the main frame 32 solves the conflict created by the large space claim of the high voltage batteries 64. This placement improves serviceability of these key components of the primary electric motor 66 and the main hydraulic pump 68 by placing them outboard on the machine 20 for easy access. This location also solves hydraulic hose and tube routing issues that would result from other placements of the main hydraulic pump 28.

Figure 10:
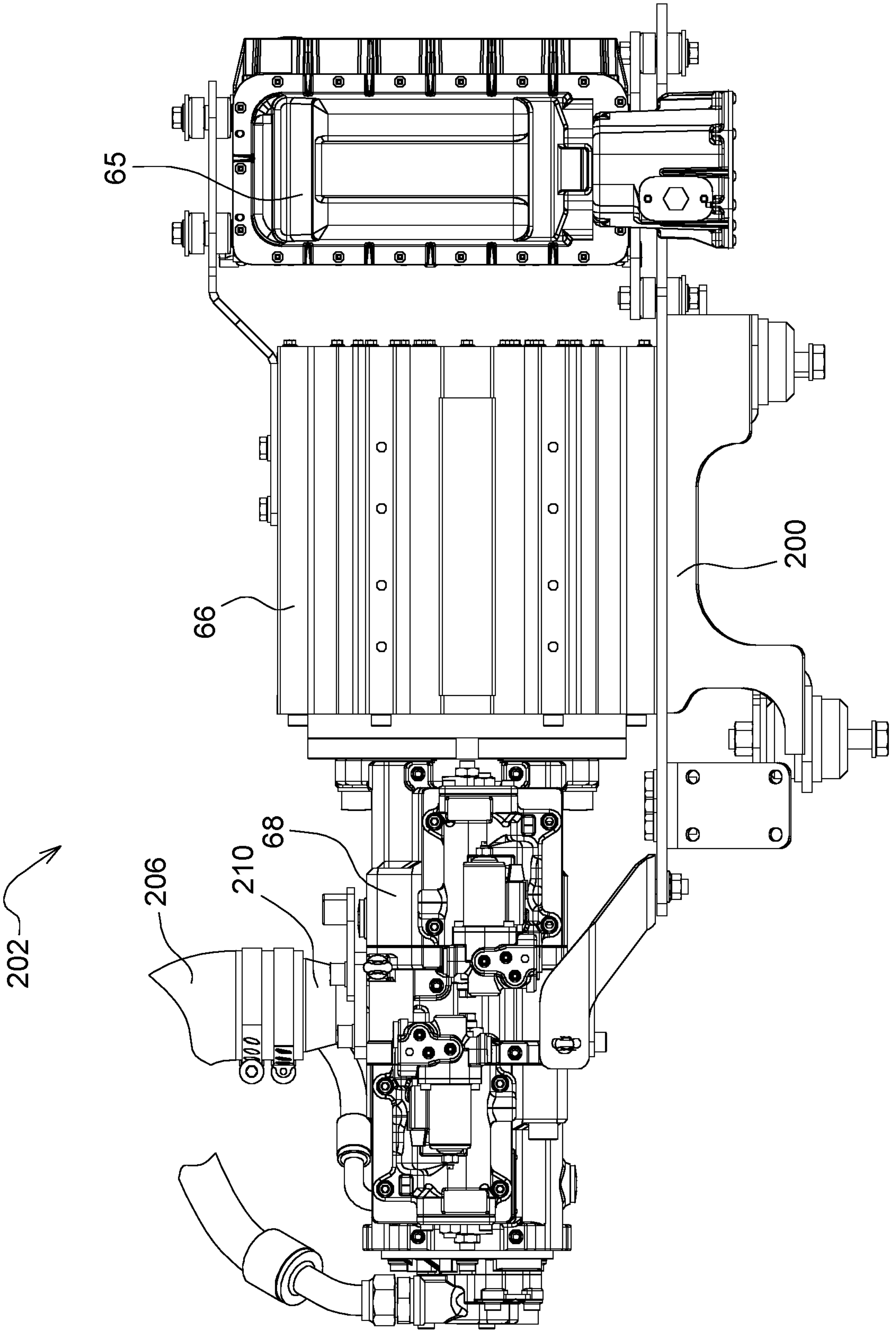
FIG. 10 is a right side elevation view of a powertrain sub-assembly including the primary electric motor, the main hydraulic pump, and a DC-AC inverter.

As best seen in FIG. 10, the power electronics package 65, which may be in the form of a DC-AC invertor 65, is operably connected to the primary electric motor 66. The primary electric motor 66, the main hydraulic pump 68, and the DC-AC invertor 65 are shown as being assembled on a common bracket 200 to provide a powertrain sub-assembly 202 mounted on the main frame 32. The use of the sub-assembly 202 makes both the assembly and the subsequent servicing of these components much easier. These components are installed and removed as a unit.

Figure 11:
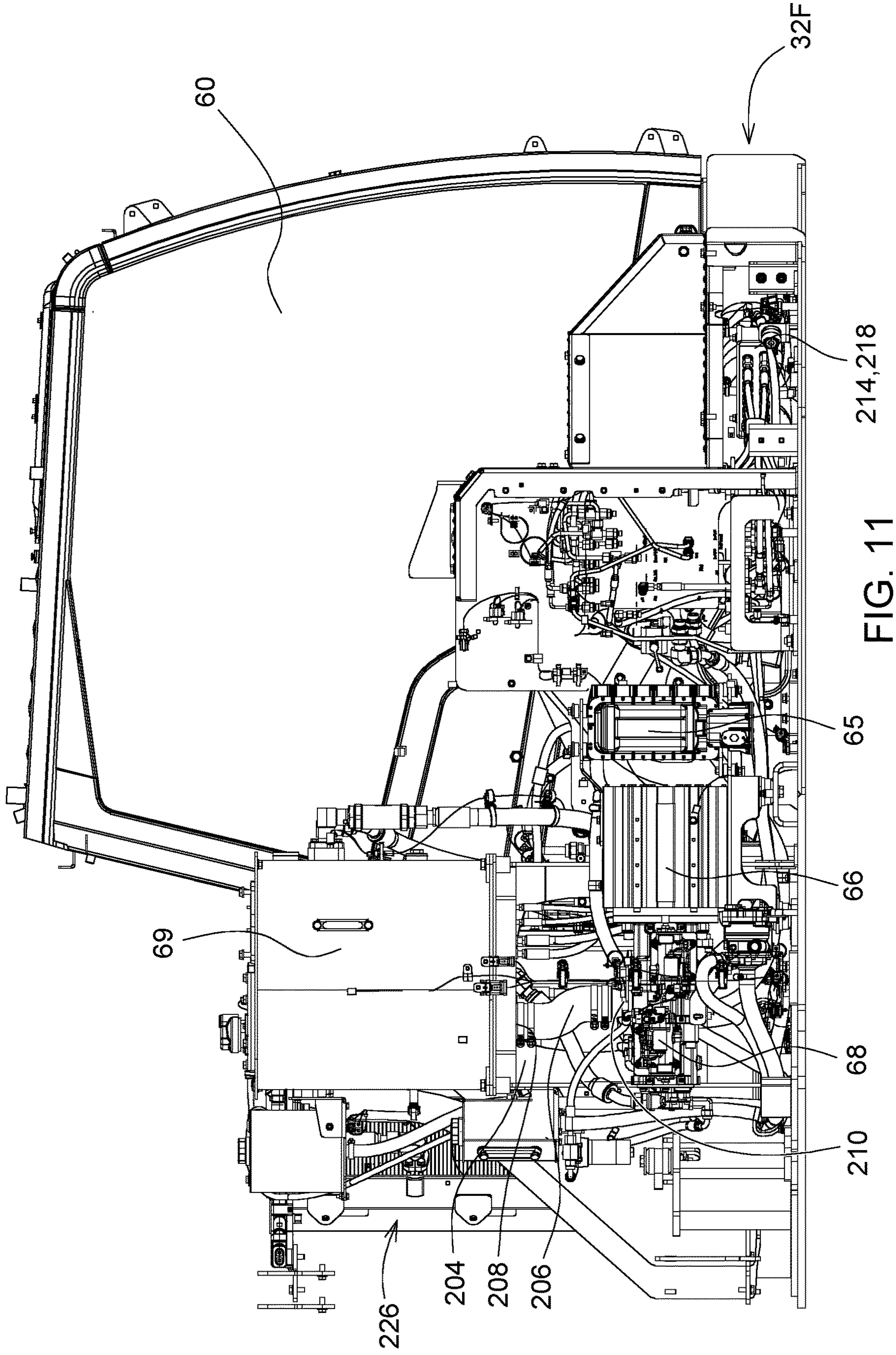
FIG. 11 is a right side elevation view of a truncated portion of the battery powered electric excavator of FIG. 1, showing the location of the main hydraulic pump under the hydraulic reservoir.

As best seen in FIG. 11, the hydraulic reservoir 69 may be mounted on a stand 204 supporting the hydraulic reservoir 69 at an elevated location above the main frame 32. The powertrain sub-assembly 202 is placed below the reservoir 69. Preferably the hydraulic reservoir 69 is located directly above the main hydraulic pump 68 such that at least a majority of a footprint of the main hydraulic pump 68 over the main frame 32 overlaps with a footprint of the hydraulic reservoir 69 over the main frame 32. This reduces the collective floor space on the main frame 32 taken up by the reservoir 69 and the powertrain sub-assembly 202. Additionally, this allows a suction conduit 206 to be placed such that it extends downward from an outlet 208 of the hydraulic reservoir 69 to a pump inlet 210 of the main hydraulic pump 68 such that hydraulic fluid standing in the suction conduit 206 provides a positive hydraulic head to the pump inlet 210.

As seen for example in FIG. 3, the footprint of the hydraulic reservoir 69 is the outline of the reservoir 69 as seen in plan view. A corresponding footprint of the hydraulic pump 68 is schematically shown in dashed lines indicating its location below the hydraulic reservoir 69.

Figure 2:
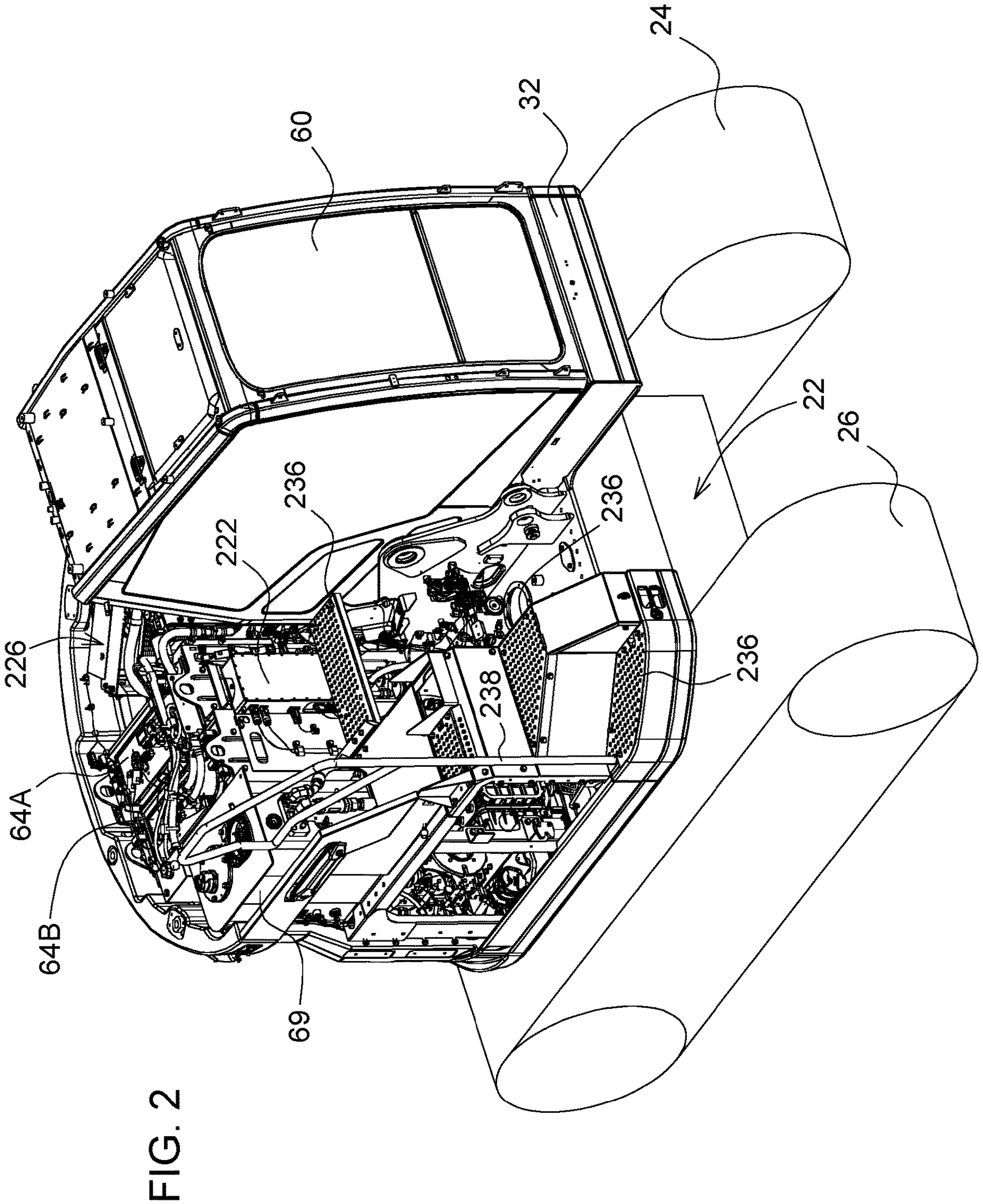
FIG. 2 is a right front upper perspective view of the battery powered electric excavator of FIG. 1, with the excavator front working unit and a number of housing panels removed to show the locations of portions of the electrical and hydraulic power systems.
Figure 8:
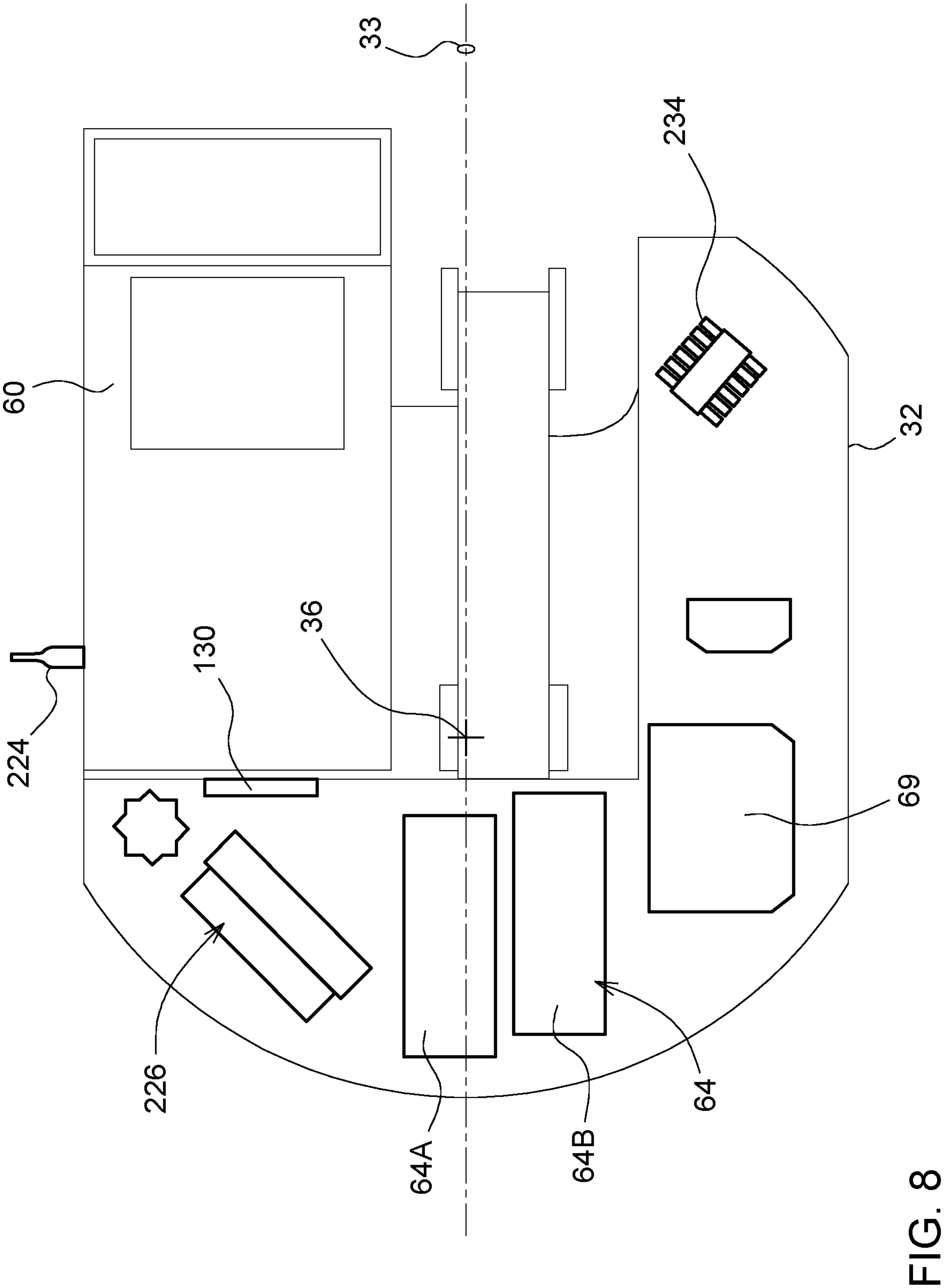
FIG. 8 is a schematic plan view of the battery powered electric excavator of FIG. 1, with the excavator front working unit and a number of housing panels removed to show the locations of portions of the electrical and hydraulic power systems.

Preferred locations of several other components are shown in FIG. 8. The controller 130 may be mounted on a rear wall of the operator's cabin 60. Electrohydraulic valves such as 28V, 30V, 40V, 45V, 47V, 49V may be located in a valve bank 234 above the right front corner of the main frame 32. FIGS. 2 and 3 also show a plurality of service platforms or steps 236 along with a handrail 238 for providing access to the various components located on the main frame 32.

Figure 15:
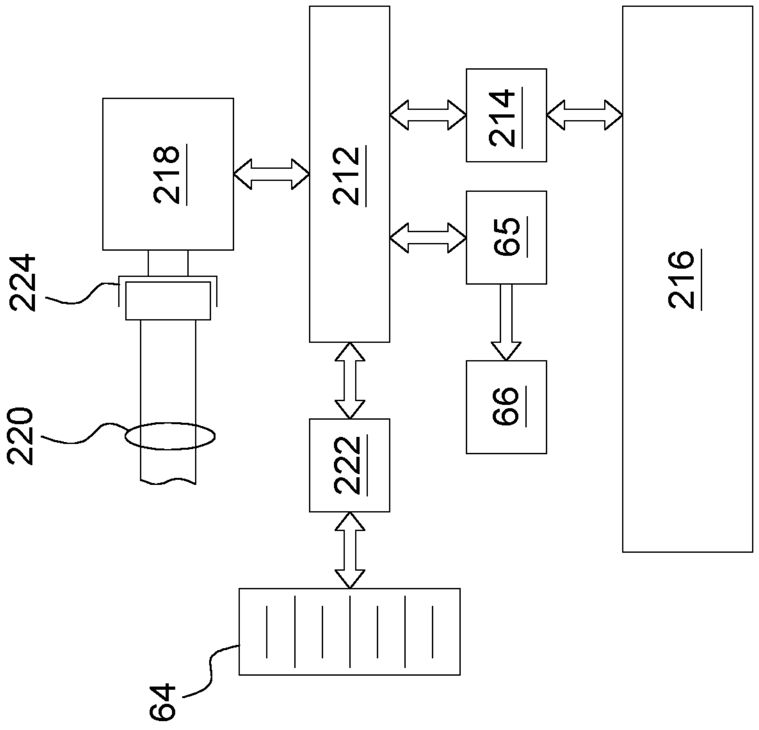
FIG. 15 is a schematic diagram of a high voltage electrical power supply system for the battery powered electric excavator of FIG. 1.

The high voltage electrical power supply system of the electric excavator 20 is shown in a high level schematic form in FIG. 15. The high voltage batteries 64 provide high voltage electric power to a high voltage bus 212. A junction box 222 joins together the various high voltage components including joining the high voltage batteries 64 to the high voltage bus 212. The high voltage bus 212 may be contained in the junction box 222. A DC/DC converter 214 converts high voltage electric power to low voltage electric power provided to a low voltage bus 216. The DC-AC invertor 65 modifies the high voltage power to drive the main electric motor 66. Various low voltage DC powered components such as accessories 122, take low voltage DC power from the low voltage bus 216. An onboard charger 218 can receive AC grid power from lower voltage external grid-based charging sources 220 and regulate and rectify such charging sources to provide power to the high voltage bus 212 and thus to the batteries 64 for recharging the same. A charge plug 224 for such external grid charging sources 220 is seen for example in FIG. 3.

The controller 130 may also control the various components of the electrical power supply system shown in FIG. 15. Charge control and management signals may be sent to the batteries 64, the on-board charger 218 and associated components. Power train control signals may be sent to the DC-AC invertor 65. Also, thermal control signals may be sent to the various components of the coolant systems of FIG. 14.

The hardware used for power conversion in the DC/DC converter 214 and the onboard charger 218 is large. Positioning of these components on the machine frame 32 is challenging due to their size as well as the routings that connect these power conversion components to the electrical power system. Both the associated electrical harness and associated cooling system lines are relatively large and have relatively large bend radii requirements. The electric excavator 20 solves these problems by locating the DC/DC converter 214 and the onboard charger 218 below the operator's cabin 60 as seen in FIG. 11.

Another packaging challenge is the location of the junction box 222 for joining together the high voltage components including the high voltage batteries 64 to the high voltage bus 212. As best seen in FIG. 12, in the electric excavator 20 the junction box 222 is located centrally between the operator's cabin 60 on one lateral side and the primary electric motor 66, the main hydraulic pump 68, and the hydraulic reservoir 69 on an opposite lateral side of the junction box 222. This places the junction box 222 in the center of the machine 20. This placement prevents many of the routing challenges and routing expense that would be associated with alternative locations. The primary function of the junction box 222 is to join the high voltage systems together. By placing the junction box 222 at the midpoint between all the major high voltage components, the routing lengths for each component in the system are optimized. Additionally, because the location is easy to access with ample spacing around its periphery, the routing into and out of the junction box 222 can be accomplished even when considering the large cable size of the electrical connections.

A further challenge in the packaging of the components of a reduced tail swing electric excavator 20 is the location of the cooling system for cooling of the various electrical components and for cooling of the hydraulic oil of the hydraulic system. This is a challenge both due to the space required for heat exchangers and fans, and due to the need to provide cooling air flow to the heat exchangers from the surrounding ambient space. The electric excavator 20 solves this problem by placement of the heat exchanger and fan assembly 226 in the left rear corner of the housing space above the main frame 32 as best seen in FIG. 3. This can be described as placing at least one heat exchanger and fan assembly 226 including at least one fan 80 for moving cooling air across at least one heat exchanger 96, 97, 114, such that the fan 80 is oriented to move the cooling air in a direction 228 at an angle 232 within plus or minus 60 degrees of the longitudinal axis 33 of main frame 32. In an embodiment the angle 232 may be in a range of 30 to 60 degrees. In another embodiment the angle 232 may be in a range of 40 to 50 degrees.

The heat exchanger and fan assembly 226 as shown includes multiple fans 80 and may also include multiple heat exchangers 96, 97 and 114.

This placement of the heat exchanger and fan assembly 226 rearward of the operator's cabin 60 and angled toward the center of the main frame 32 allows the air-cooled heat exchanger to draw in cooling air from outside the main frame 32 and to discharge the cooling air across a central portion of the main frame 32 toward the open forward end 32F of the main frame 32. This is contrasted to the traditional orientation of cooling systems in excavators in which the flow direction of cooling air is typically from left to right or right to left across the narrow width of the machine frame.

An alternative location for the heat exchanger and fan assembly 226 is shown in FIG. 9, which as noted above also shows an alternative arrangement of the batteries 64. In FIG. 9 the heat exchanger and fan assembly 226 is located in the right rear corner of the main frame 32 and is oriented so that its fan direction is substantially forward. In the embodiment of FIG. 9 the fan assembly 226 is oriented such that the direction of the cooling air is at an angle substantially parallel to the longitudinal axis of the main frame. As used herein the term "substantially parallel" includes angles within plus or minus ten degrees of exactly parallel. The heat exchanger and fan assembly 226 of FIG. 9 could also be angled rearward and to the right side in a mirror image of the orientation for the heat exchanger and fan assembly 226 of FIG. 8.

Another alternative location for the heat exchanger and fan assembly 226 is shown in FIG. 9A, which as noted above also shows an alternative arrangement of the batteries 64. In FIG. 9A the heat exchanger and fan assembly 226 is located in the right rear corner of the main frame 32 and is oriented so that its fan direction is substantially forward. In the embodiment of FIG. 9A the fan assembly 226 is oriented such that the direction of the cooling air is at an angle substantially parallel to the longitudinal axis of the main frame. The heat exchanger and fan assembly 226 of FIG. 9A could also be angled rearward and to the right side in a mirror image of the orientation for the heat exchanger and fan assembly 226 of FIG. 8.

The present disclosure has provided a number of improvements in the packaging of the major components of an electrically powered excavator, particularly of a reduced tail swing electrically powered excavator.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A battery powered electric excavator, comprising:
- an undercarriage including left and right crawler tracks;
- a main frame mounted on the undercarriage to be pivotable about a vertical pivot axis relative to the undercarriage, the main frame having a forward end and a rearward end and having a longitudinal axis extending between the forward end and the rearward end;
- an excavator arm extending from the forward end of the main frame;
- an operator's cabin located on the main frame closer to the forward end than to the rearward end, and located to one lateral side of the vertical pivot axis;
- at least one high voltage battery located on the main frame rearward of the vertical pivot axis and rearward of the operator's cabin;
- a primary electric motor operably connected to the at least one high voltage battery, the primary electric motor being a prime mover of the battery powered electric excavator such that the battery powered electric excavator does not include an internal combustion engine as a prime mover;
- at least one main hydraulic pump driven by the primary electric motor;
- a hydraulic reservoir for supplying hydraulic fluid to the main hydraulic pump; and
- wherein the primary electric motor, the main hydraulic pump, and the hydraulic reservoir are located on the main frame on an opposite lateral side of the vertical pivot axis from the operator's cabin;
- wherein the hydraulic reservoir is located directly above the main hydraulic pump; and
- wherein at least a majority of a footprint of the main hydraulic pump over the main frame overlaps with a footprint of the hydraulic reservoir over the main frame.

2. The battery powered electric excavator of claim 1, wherein:
- the main frame is configured as a reduced tail swing main frame in which the rearward end of the main frame does not extend more than 18 inches beyond the crawler tracks during pivoting of the main frame on the undercarriage.

3. The battery powered electric excavator of claim 1, further comprising:
- a DC-AC inverter operably connected to the primary electric motor; and
- wherein the primary electric motor, the main hydraulic pump and the DC-AC inverter are assembled on a common bracket to provide a powertrain sub-assembly mounted on the main frame.

4. The battery powered electric excavator of claim 1, further comprising:
- a suction conduit extending downward from an outlet of the hydraulic reservoir to a pump inlet of the main hydraulic pump such that hydraulic fluid standing in the suction conduit provides a positive hydraulic head to the pump inlet.

5. The battery powered electric excavator of claim 1, further comprising:
- a DC/DC converter for powering a low voltage bus of the excavator from a high voltage bus of the excavator;
- an onboard charger for regulating and rectifying lower voltage charge sources to a higher voltage of the high voltage bus of the excavator; and
- wherein the DC/DC converter and the onboard charger are located below the operator's cabin.

6. The battery powered electric excavator of claim 1, further comprising:
- a junction box for joining together a plurality of high voltage components including the high voltage battery, the junction box being located centrally between the operator's cabin on one lateral side and the primary electric motor, the main hydraulic pump, and the hydraulic reservoir on an opposite lateral side of the junction box.

7. The battery powered electric excavator of claim 1, further comprising:
- at least one heat exchanger and fan assembly including at least one fan for moving cooling air across at least one heat exchanger, the fan being oriented to move the cooling air in a direction within plus or minus 60 degrees of the longitudinal axis of the main frame.

8. The battery powered electric excavator of claim 7, wherein:
- the fan is oriented such that the direction of the cooling air is at an angle between 30 and 60 degrees relative to the longitudinal axis of the main frame.

9. The battery powered electric excavator of claim 7, wherein:
- the fan is oriented such that the direction of the cooling air is at an angle substantially parallel to the longitudinal axis of the main frame.

10. The battery powered electric excavator of claim 7, wherein:
- the heat exchanger and fan assembly is configured to cool the hydraulic fluid.

11. The battery powered electric excavator of claim 7, wherein:

the heat exchanger and fan assembly is configured to cool a battery coolant fluid.

12. The battery powered electric excavator of claim 7, wherein:

the heat exchanger and fan assembly is configured to cool one or more electronics packages of the excavator.

13. A battery powered electric excavator, comprising:

an undercarriage including left and right crawler tracks;

a main frame mounted on the undercarriage to be pivotable about a vertical pivot axis relative to the undercarriage, the main frame having a forward end and a rearward end;

an excavator arm extending from the forward end of the main frame;

an operator's cabin located on the main frame;

at least one high voltage battery located on the main frame;

a primary electric motor operably connected to the at least one high voltage battery, the primary electric motor being a prime mover of the battery powered electric excavator such that the battery powered electric excavator does not include an internal combustion engine as a prime mover;

at least one main hydraulic pump driven by the primary electric motor;

a hydraulic reservoir for supplying hydraulic fluid to the main hydraulic pump; and wherein the hydraulic reservoir is located directly above the main hydraulic pump such that at least a majority of a footprint of the main hydraulic pump over the main frame overlaps with a footprint of the hydraulic reservoir over the main frame.

14. The battery powered electric excavator of claim 13, further comprising:

a DC-AC inverter operably connected to the primary electric motor; and wherein the primary electric motor, the main hydraulic pump and the DC-AC inverter are assembled on a common bracket to provide a powertrain sub-assembly mounted on the main frame.

15. The battery powered electric excavator of claim 13, further comprising:

a suction conduit extending downward from an outlet of the hydraulic reservoir to a pump inlet of the main hydraulic pump such that hydraulic fluid standing in the suction conduit provides a positive hydraulic head to the pump inlet.

* * * * *